United States Patent [19]

Lake

[11] Patent Number: 5,747,190

[45] Date of Patent: May 5, 1998

[54] MULTILAYERED BATTERY HAVING A CURED CONDUCTIVE INK LAYER

[75] Inventor: Rickie C. Lake, Eagle, Id.

[73] Assignee: Micron Communications, Inc., Boise, Id.

[21] Appl. No.: 834,292

[22] Filed: Apr. 15, 1997

Related U.S. Application Data

[60] Division of Ser. No. 645,614, May 14, 1996, which is a continuation-in-part of Ser. No. 71,463, Jun. 2, 1993, Pat. No. 5,624,468.

[51] Int. Cl.$^6$ .............................. H01M 6/40; H01M 2/30
[52] U.S. Cl. ..................... 429/124; 429/162; 429/175
[58] Field of Search ............................ 429/124, 191, 429/162, 127, 175

[56] References Cited

U.S. PATENT DOCUMENTS

| | | | |
|---|---|---|---|
| 4,125,684 | 11/1978 | Land | 429/122 |
| 4,172,319 | 10/1979 | Bloom et al. | 29/623.4 |
| 4,177,552 | 12/1979 | Gordon et al. | 29/623.4 |
| 4,621,035 | 11/1986 | Bruder | 429/152 |
| 4,888,206 | 12/1989 | Hope et al. | 427/57 |
| 4,911,995 | 3/1990 | Belanger et al. | 429/192 |
| 4,935,317 | 6/1990 | Fauteux et al. | 429/192 |
| 5,080,932 | 1/1992 | Koksbang et al. | 427/209 |
| 5,169,446 | 12/1992 | Koksbang et al. | 118/69 |
| 5,591,540 | 1/1997 | Louie et al. | 429/162 X |
| 5,612,152 | 3/1997 | Bates | 429/191 X |

*Primary Examiner*—John S. Maples
*Attorney, Agent, or Firm*—Wells, St. John, Roberts, Gregory & Matkin, P.S.

[57] ABSTRACT

The invention is directed to batteries having a nonconductive layer next to a conductive layer wherein the conductive layer comprises a cured conductive ink. The anode is against the conductive ink layer.

12 Claims, 9 Drawing Sheets

_Fig 2C_

_Fig 2D_

MULTILAYERED BATTERY HAVING A CURED CONDUCTIVE INK LAYER

RELATED PATENT DATA

This patent resulted from a divisional application of U.S. patent application Ser. No. 08/645,614, filed on May 14, 1996, entitled "Battery Constructions And Method For Forming Such Battery Constructions", listing the inventor as Rickie C. Lake, which is a continuation-in-part application of U.S. patent application Ser. No. 08/071,463, filed Jun. 2, 1993, which is now issued U.S. Pat. No. 5,624,468; which is related to U.S. patent application Ser. No. 008,529, filed Jan. 25, 1993, and now issued as U.S. Pat. No. 5,326,652.

TECHNICAL FIELD

The present invention relates generally to a process for forming a battery and to batteries.

BACKGROUND OF THE INVENTION

Advancements in semiconductor technology have led to the production of large scale integrated circuits which have revolutionized the electronics industry. Microelectronic components are now widely used in the production of a variety of electronic devices, such as portable computers, calculators, watches, cordless telephones, radios, tape recorders, and security systems. Development of such electronic devices has brought about the evolution of batteries as miniature power supplies. In light of their applications, this new generation of batteries must produce higher energy per unit volume and superior discharge characteristics.

The technology related to thin solid state batteries has been developing at a rapid pace. Thin solid state batteries are typically fabricated employing an alkali metal anode, a non-aqueous electrolyte, and cathodes of nonstoichiometric compounds, such as teachings of U.S. Pat. Nos. 4,621,035; 4,888,206; 4,911,995; 5,169,446 and 5,080,932. Of the alkali metals commercially feasible in manufacturing the anode material, lithium is preferred because it has a low atomic weight, while having a high electronegativity. These thin batteries require a high energy density, a long shelf life and efficient operation over a wide range of temperatures.

One known method for fabricating a thin battery cell is shown in FIGS. 1 (A–G). Referring to FIG. 1(A), a current collector film 110 is initially provided. Collector film 110 can comprise a variety of conductive materials, including but not limited to stainless steel, copper, nickel or aluminum. Subsequently, as shown in FIG. 1(B), a cathode layer 112 is positioned superjacent the current collector film, preferably by extrusion. This step also involves curing to sufficiently polymerize the cathode. Referring to FIG. 1(C), after the cathode layer is cured, an electrolyte layer 114 is positioned superjacent the cathode and subsequently cured, thereby forming current collector-cathode-electrolyte sandwich 115. Next, from the current collector-cathode-electrolyte sandwich 115, a multitude of subsections 116 are formed, as shown in FIG. 1(D). Then, each subsection 116 has an anode foil 118 comprising lithium or some other suitable alkali positioned superjacent, as illustrated in FIG. 1(E). Referring to FIG. 1(F), a second conductive layer 120 is then subsequently positioned superjacent the anode foil 118.

Figure 1A:
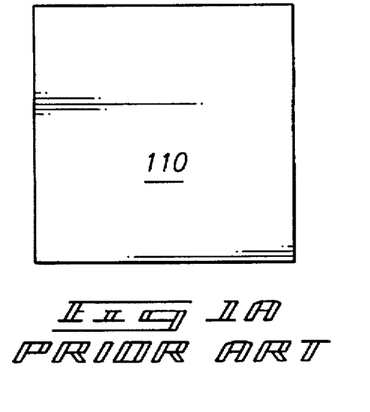
Figure 1B:
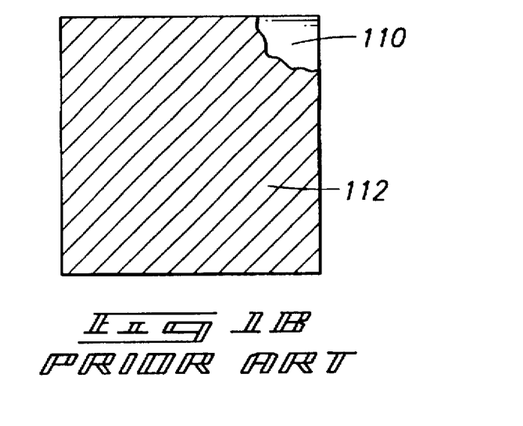
Figure 1C:
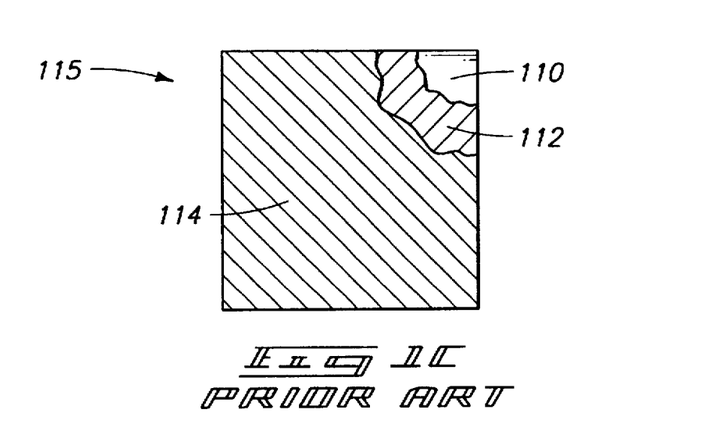
Figure 1D:
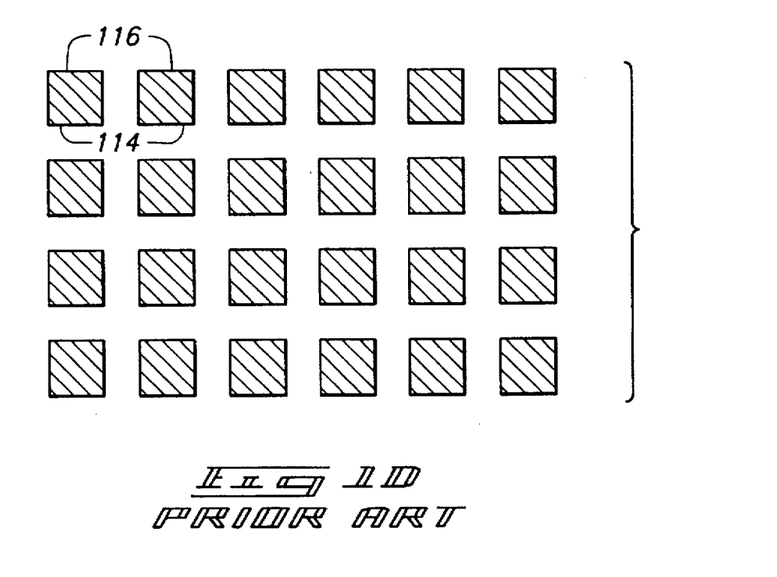
Figure 1E:
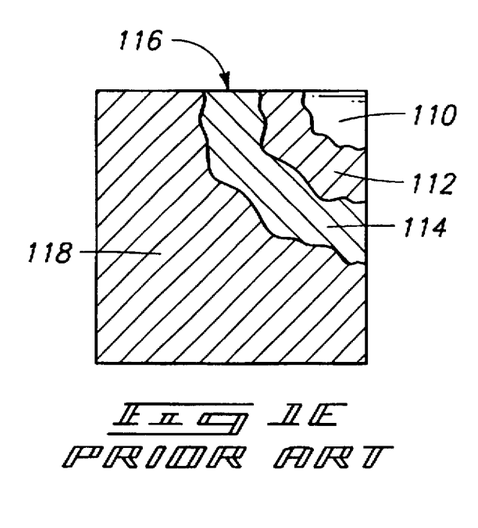
Figure 1F:
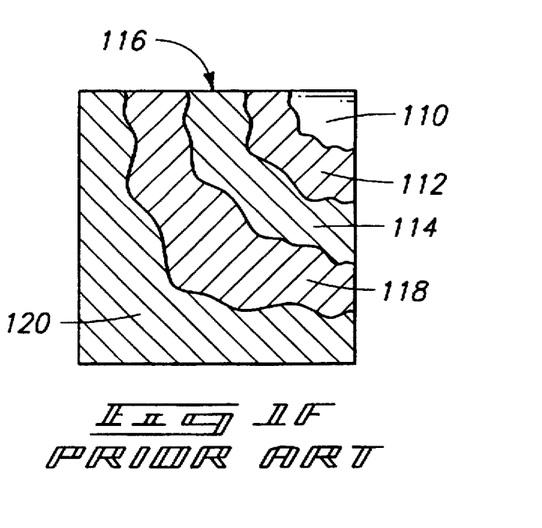
Figure 1G:
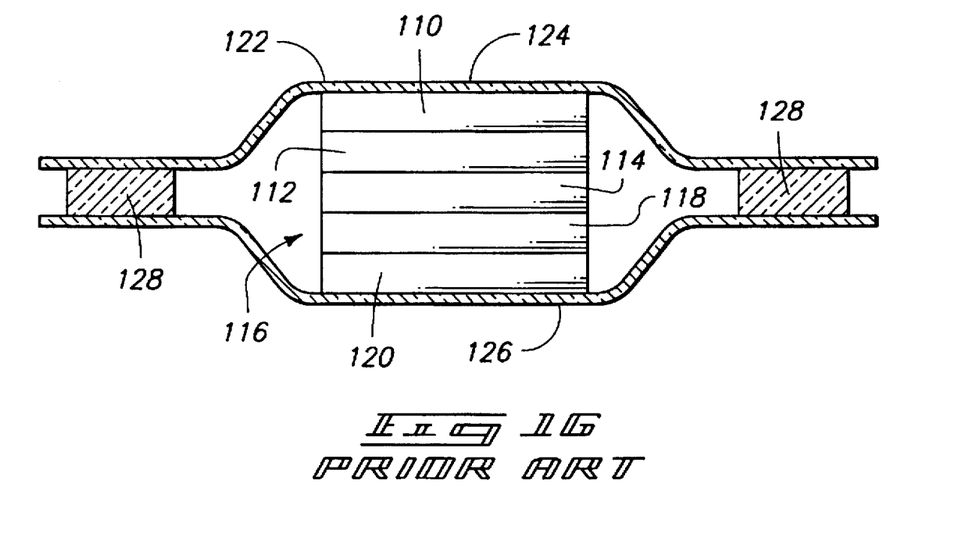

Referring to FIG. 1(G), each subsection 116 is then packaged in a stainless steel enclosure 122 such that one current collector is in electrical contact with the top portion 124 of the stainless steel enclosure and the other collector is in contact with the bottom portion 126 of the enclosure. To ensure against potential shorting, insulation 128 is positioned within the enclosure between the top and bottom portions of the stainless steel enclosure.

Previously, thin battery manufacturing technology has relied on forming and assembling the anode, electrolyte, and cathode of the battery as separate components. However, this is a relatively labor intensive procedure that involves the intricate assembly of a number of discrete components. The stamping and handling of individual discs of lithium is particularly costly and awkward because of lithium's expense and relatively high reactivity. Thin lithium foil is also difficult to work with. Thin lithium foil comprises malleable, low tensile strength properties. Moreover, lithium foil adheres to a large number of other materials.

In light of these shortcomings, there have been several developments in the manufacturing processes of thin battery technology. These advancements, such as U.S. Pat. No. 4,911,995, and U.S. Pat. No. 4,621,035, have relied on the utilization of a thin metal film as a metalization layer. This metalization layer is then employed with an alkali metal to form an anode. However, these approaches fail to provide a battery which has the flexibility and durability required in some electronics applications, as well as a simplified means for manufacturing.

Polymer thick film inks have yet to be examined as a conductive layer from which a lithium anode may be formed. Many of the difficulties in manufacturing polymer batteries are related to handling and assembling the lithium anodes, the cathodic polymers and the electrolytic polymers. These issues are compounded in part because most techniques known in the art for fabricating these battery types involve forming one battery cell at a time.

BRIEF DESCRIPTION OF THE DRAWINGS

Preferred embodiments of the invention are described below with reference to the following accompanying drawings.

FIG. 1 (A)–(G) are planar cut-away views of a prior art method for fabricating a battery cell.

FIG. 2 (A)–(F) are planar cut-away views of a first base undergoing steps of the present invention.

FIG. 3 (A)–(E) are planar cut-away views of a second base undergoing steps of the present invention.

It is emphasized that the drawings of the instant application are merely schematic representations and are not intended to portray the specific parameters of the structural details of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of the invention, a method of making a battery comprises the step of fusing an alkali metal onto a patterned conductive layer.

In accordance with another aspect of the invention, a method of forming a battery comprises:

providing a cathode base, the cathode base comprising:

3 a first nonconductive surface;

a first conductive layer superjacent the first nonconductive surface;

the first conductive layer comprising a first area; and a cathode layer superjacent the first conductive layer leaving at least a portion of the first area exposed;

providing an anode base, the anode base comprising:

a second nonconductive surface;

a second conductive layer superjacent the first nonconductive surface, the second conductive layer comprising a second area; and an anode layer superjacent the second conductive layer leaving at least a portion of the second area exposed, the anode layer comprising an alkali metal; and aligning and coupling the anode layer of the anode base with the cathode layer of the cathode base, wherein the aligning and coupling leaves at least a portion of the first area and at least a portion of the second area exposed for electrical connection.

In accordance with another aspect of the invention, a battery comprises:

a first nonconductive layer;

a first conductive layer against the first nonconductive layer;

a cathode against the first conductive layer;

a second nonconductive layer;

a second conductive layer against the second nonconductive layer, the second conductive layer comprising a cured conductive ink; and an alkali metal fused to the second conductive layer.

More specifically, the present invention encompasses formation of a cathode base and an anode base, and the subsequent coupling of these bases to form a battery. The present invention also encompasses batteries formed by such a method.

The formation of a cathode base in accordance with the present invention is described with reference to FIG. 2(A–F).

Figure 2A:
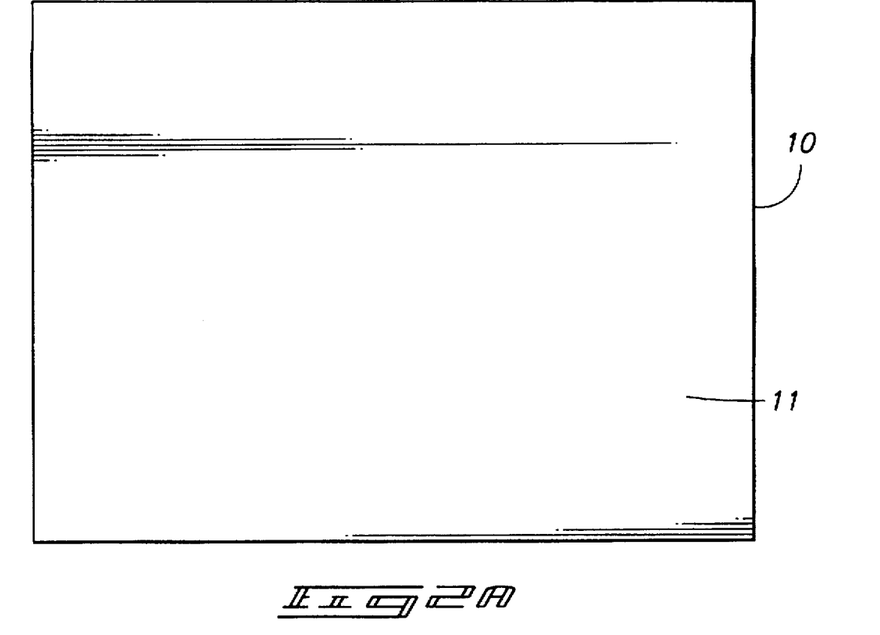

Referring to FIG. 2(A), a nonconductive first base 10 is provided. As shown, first base 10 has an upper surface 11. First base 10 is preferably an electrically insulating (nonconductive) film and preferably comprises polyimide. A polyimide film which has been found to be suitable for the present invention is sold under the trademark KAPTON from Dupont. Polyester, glass, ceramics, or other polymer films may also be employed as materials in the construction of first base 10. Optimally, first base 10 is an elastic material. This will help to create a flexible battery.

Figure 2B:
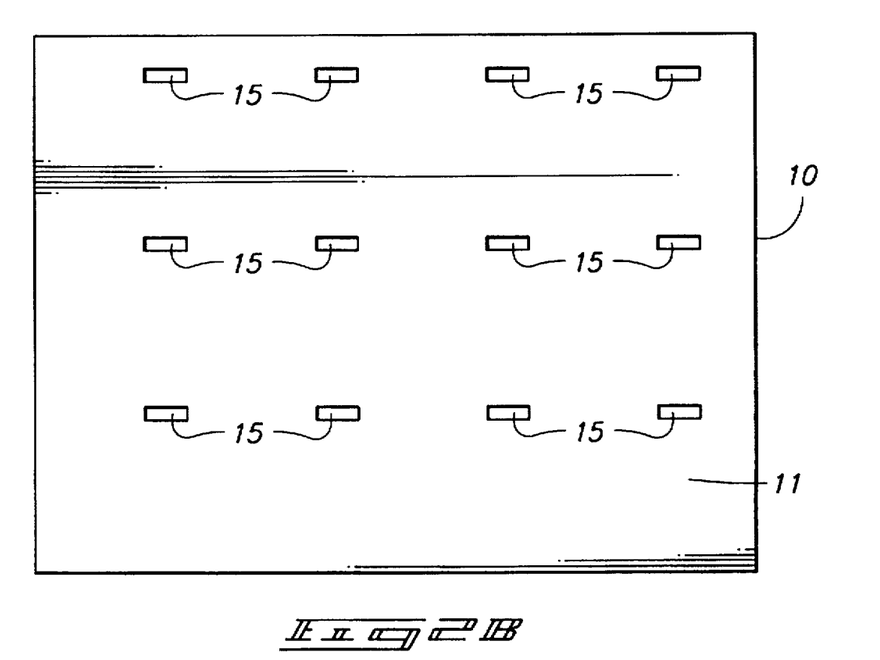

Referring to FIG. 2(B), one or more first voids or slots 15 are provided within first base 10. Slots 15 provide electrical access to an eventually formed anode, as described below with reference to FIGS. 4 and 5. Slots 15 may be punched out of base 10, or formed during extrusion of base 10, or formed by alternate methods known to persons of ordinary skill in the art.

Figure 2C:
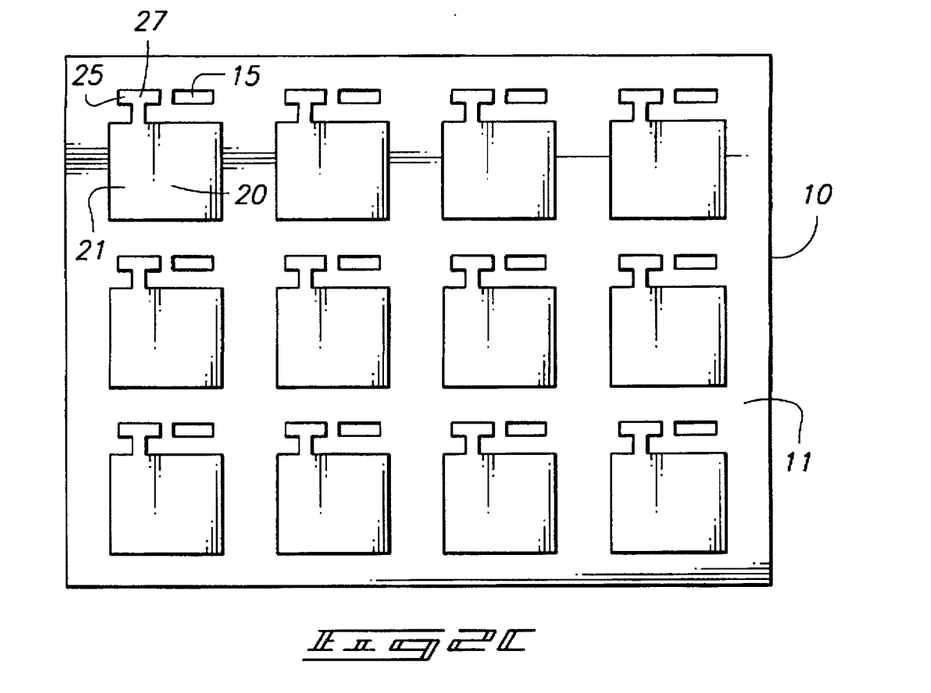

Referring to FIG. 2(C), a first conductive layer 20 is provided superjacent first base 10 and aligned with first slots 15. Preferably, conductive layer 20 is applied to base 10 to form a pattern which covers only a portion of upper surface 11 and which has a plurality of substantially identical repeating units 21 aligned in a one-to-one correspondence with each slot of the plurality of slots 15. First conductive layer 20 serves the same functional purposes as the current collector of the known art. However, because its formation employs conductive ink technologies, it provides much

4 greater flexibility. First conductive layer 20 preferably comprises conductive polymer thick film ink. However, the conductive layer 20 may instead comprise standard thick film ink or high temperature thick film ink. Standard and thick film inks are generally fixed at relatively high temperatures, above 800° C., and are therefore generally most suitable for bases comprising materials with high temperature stability, such materials including ceramics and glass.

Alternatively conductive layer 20 may be provided as a metallic layer superjacent first base 10. One method for forming such a metallic layer is to start with an insulative film having a layer of metal across it's surface. The metallic layer is then etched to form the second conductive layer 20, in a pattern comprising the repeating unit 21, over a first base 10 comprising the insulative film. The starting insulative film with a layer of metal on it's surface can be made by several methods known to persons of skill in the art, such as by vapor depositing, sputter depositing, or adhesively adhering a metal onto a polyimide or polyester sheet. The starting insulative film with a layer of metal on it's surface can also be purchased. One such purchased film which has been found to be satisfactory for the present invention is sold as copper-clad KAPTON by Dupont.

If first conductive layer 20 is formed from a ink, the provision of conductive layer 20 preferably involves two independent steps. First, the ink, in liquid form, is printed directly superjacent first base 10. Second, the ink is cured to form layer 20. The curing step can be accomplished through a variety of means, including exposing the ink to energy in one or more of the forms of heat, ultraviolet light, infrared light, or electron beam energy. The choice of the form of energy may be varied depending on the type of ink selected. The temperature employed in order to complete the step of curing varies depending on the length of heating, as well as the thickness of the film. Example conditions for curing a polymer thick film ink are from about 130° C. to about 165° C. for approximately 60 seconds to approximately 30 minutes.

If conductive layer 20 is formed from a metallic layer, it may be provided by methods identical to those discussed below regarding the application of a second conductive layer 60 (shown in FIG. 3C) to a second base 50 (shown in FIG. 3C).

In the shown embodiment of the present invention, first conductive layer 20 is in electrical contact with a first conductive pad area 25. Preferably, pad area 25 is applied simultaneously with layer 20. However, first conductive pad 25 may also be applied before or after first conductive layer 20 is provided, such as by printing pad 25 after provision of layer 20. As discussed below with reference to FIGS. 4 and 5, conductive pad area 25 forms a cathode contact 27 for electrical connection to the cathode of the finally formed battery 95 (shown in FIG. 5).

Figure 2D:
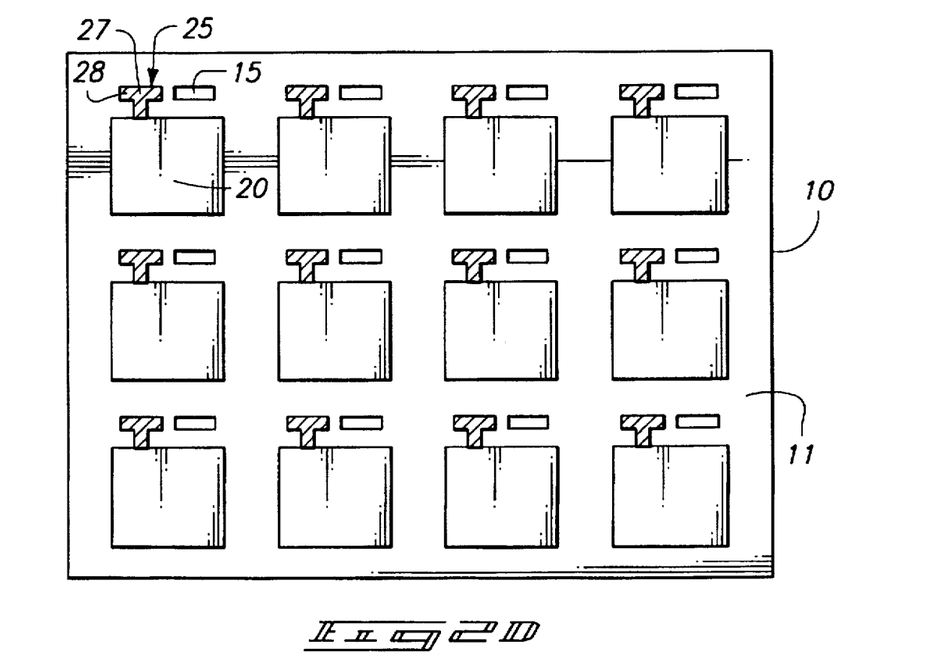

Referring to FIG. 2(D), first conductive pad 25 may be covered by a capped tip 28. Tip 28 is preferably formed by printing a carbon based polymer thick film ink directly onto a portion of first conductive pad 25 and curing the combination using the techniques described above regarding the curing of layer 20. Capped tip 28 increases the wear resistance and durability of cathode contact 27.

Figure 2E:
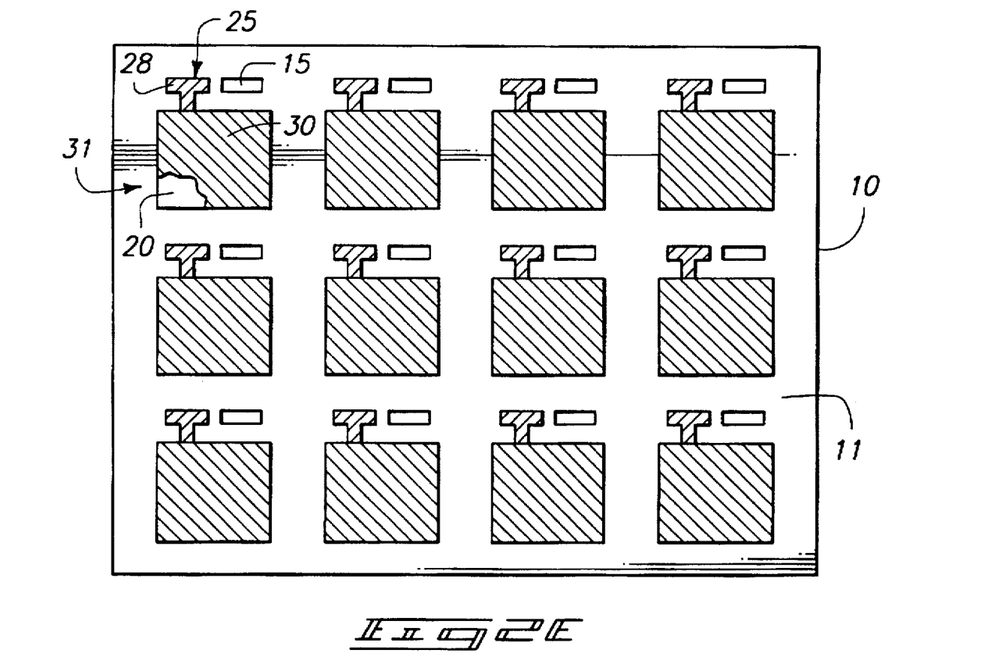

Referring to FIG. 2(E), a cathode layer 30 is provided superjacent first conductive layer 20. Cathode layer 30 may be provided as a conductive liquid or paste. In a less preferred embodiment, cathode layer 20 may also be provided as a conductive solid.

The cathode material selected will generally comprise one or more of manganese, cobalt, $MnO_2$, $V_2O_5$ or $V_6O_{13}$.

Cathode layer 30 may also comprise other materials known to persons of ordinary skill in the art.

If cathode layer 30 is provided as a liquid or paste, the provision preferably comprises the following two steps. First, the material of cathode layer 30, in liquid form, is applied superjacent first conductive layer 20. Most preferably, this application is accomplished by screen, stencil or pad printing the liquid onto layer 20. Second, the material of cathode layer 30 is cured. The curing step may be accomplished using the techniques described above regarding the curing of first conductive layer 20.

If the cathode layer 30 is provided as a solid, a conductive epoxy resin may be provided between cathode layer 30 and first conductive layer 20 to help adhere cathode layer 30 to conductive layer 20.

Provision of cathode layer 30 over conductive layer 20 completes formation of a cathode base 31. The individual cathode bases 31 can next be cut-away and separated from one another. In a less preferred embodiment of the invention, which has not been shown, only one individual cathode base 31 is patterned onto the insulative base 10. In such a less preferred embodiment there is no need to cut and separate individual cathode bases.

Figure 2F:
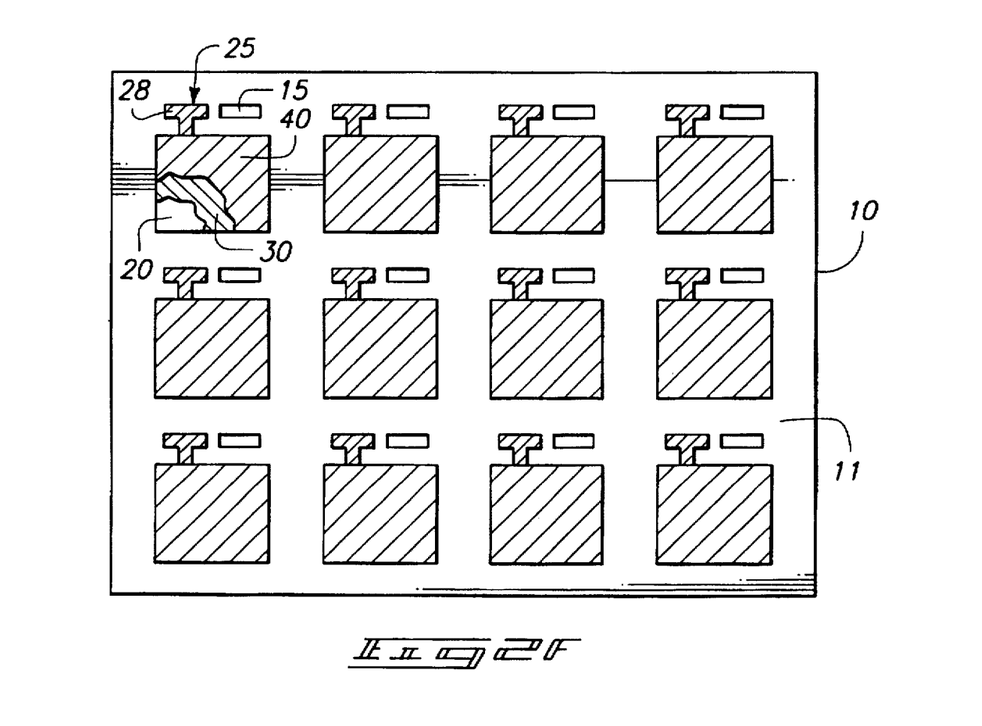

Referring to FIG. 2(F), an electrolyte film 40 may be provided superjacent cathode 30 before the individual cathode bases 31 are cutaway and separated from one another. Electrolyte film 40 preferably comprises a liquid or paste, and is most preferably screen or stencil s printed onto cathode layer 30 and not onto the uncovered surfaces of surface 11 (surface 11 is described with reference to FIG. 2A). Provision of electrolyte film 40 preferably comprises two steps. First, electrolyte film 40, in the liquid or paste form, is applied superjacent cathode layer 30. Second, electrolyte film 40 is cured. The curing step may be accomplished using the techniques described above regarding the curing of layer 20. Although a preferred method for applying electrolyte film 40 is described, known methods for applying electrolyte film, such as the placement of a sheet of electrolyte film superjacent cathode layer 30, may also be employed with the method of the present invention. Also, although electrolyte film 40 is shown provided with cathode base 31, the electrolyte film may also be provided with an anode base 71 (described below), or as a film which is separate from both the anode base and the cathode base prior to the final battery 95 (shown in FIG. 5) being formed.

The formation of an anode base in accordance with the present invention is described with reference to FIGS. 3(A–E).

Figure 3A:
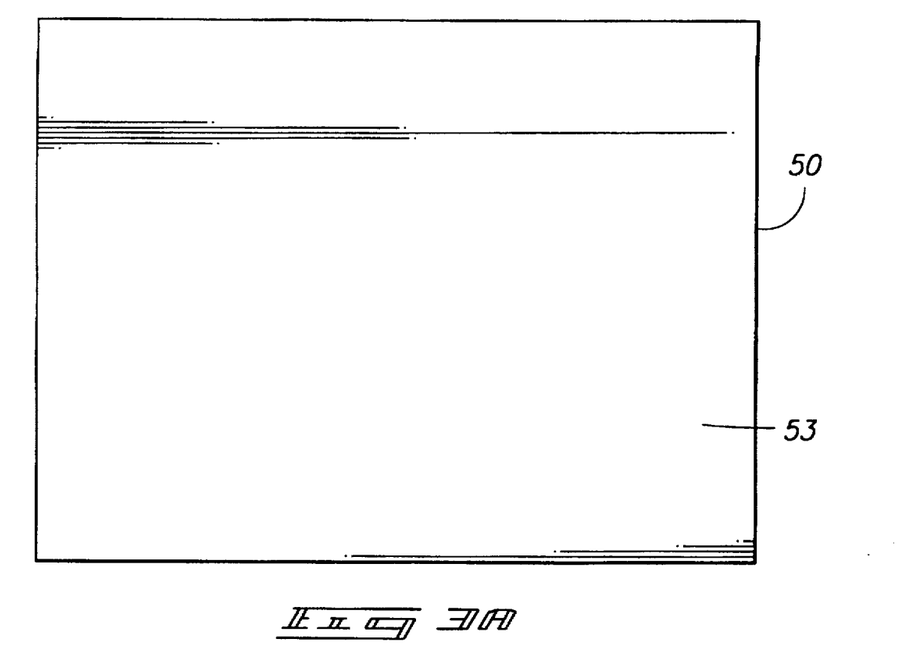

Referring to FIG. 3(A), a nonconductive second base 50 is shown. As shown, second base 50 has an upper surface 53. Second base 50 is preferably an electrically insulating (nonconductive) film, and preferably comprises polyimide. A suitable polyimide film for the process of the present invention is sold under the trademark KAPTON from Dupont. Polyester, glass, ceramics or other polymer films may also be employed in the construction of base 50. Preferably, second base 50, like the above-discussed first base 10, is a very elastic material.

Figure 3B:
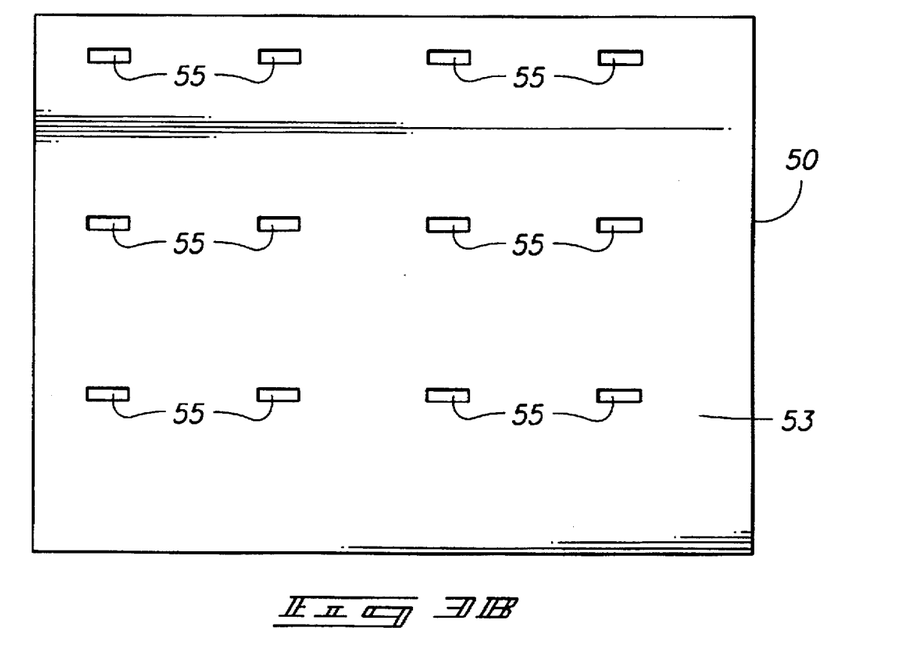

Referring to FIG. 3(B), one or more second voids, or slots, 55 are provided within second base 50. Slots 55 provide electrical access to cathode layer 30, as described below with reference to FIGS. 4 and 5. Slots 55 are preferably punched out or extruded from second base 50, but may be formed by alternate methods known to persons of ordinary skill in the art.

Figure 3C:
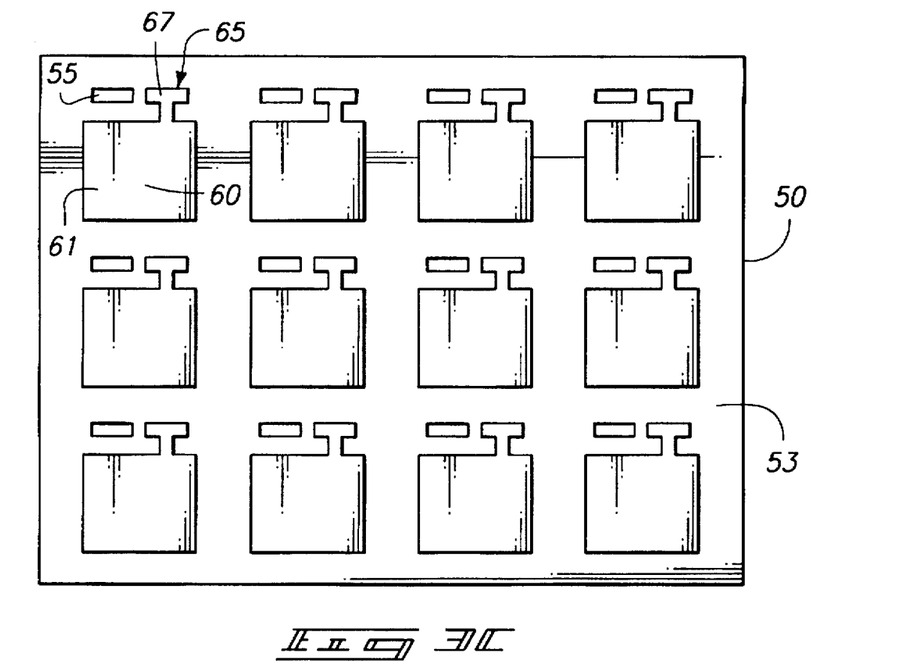

Referring to FIG. 3(C), a second conductive layer 60 is provided superjacent second base 50 and aligned with second slots 55. Second conductive layer 60 preferably comprises either a conductive polymer thick film ink or a metallic layer. Like the conductive layer 20, discussed above, conductive layer 60 may also be formed from standard thick film ink or from high temperature thick film ink.

Preferably, conductive layer 60 forms a pattern over second base 50 which covers only a portion of upper surface 53 and which has a plurality of substantially identical repeating units 61 aligned in a one-to-one correspondence with each slot of the plurality of slots.

A preferable procedure for providing second conductive layer 60 superjacent second base 50 involves applying a liquid conductive polymer thick film ink onto the second base 50. Such conductive polymer thick film inks typically comprise electrically conductive metallic flecks, such as flecks of silver or copper. In this preferable procedure, the conductive polymer thick film ink, in a liquid form, is applied directly superjacent second base 50 in a pattern comprising the repeating unit 61. The liquid ink is preferably applied by a printing method, such as pad printing or stencil printing. After the ink is applied, it is cured to form the second conductive layer 60. The curing step can be accomplished using the techniques described above regarding the curing of layer 20.

An alternate procedure for providing second conductive layer 60 superjacent second base 50 involves forming a metallic layer on base 50. One method for forming such a metallic layer is to start with an insulative film having a layer of metal across it's surface. The metallic layer is then etched to form the second conductive layer 60, in a pattern comprising the repeating unit 61, over a second base 50 comprising the insulative film. The starting insulative film with a layer of metal on it's surface can be made by several methods known to persons of skill in the art, such as by vapor depositing, sputter depositing, or adhesively adhering a metal onto a polyimide or polyester sheet. The starting insulative film with a layer of metal on it's surface can also be purchased. One such purchased film which has been found to be satisfactory for the present invention is sold as copper-clad KAPTON by Dupont.

In some embodiments of the invention, the layer 60, once formed, is plated. Such plating may provide a better metallic surface for the fusing of an alkali metal which occurs in later steps of the invention. The plating may be accomplished by either electrolytic or electroless methods. If the conductive layer 60 which is to be plated has been formed from a thick film ink, the thick film ink will preferably be a plateable thick film ink. An example plateable thick film ink which has been found to work for the process of the present invention is plateable electrically conductive ink. Number 117-31, sold by Creative Materials Incorporated, located in Tyngsboro, Mass.

In the shown embodiment of the present invention, second conductive layer 60 is in electrical contact with a second conductive pad area 65. Pad area 65 is generally formed by the same methods used to form conductive layer 60. Preferably, pad area 65 is provided simultaneously with layer 60. However, second conductive pad 65 may also be provided before or after second conductive layer 60, such as by printing pad area 65 after the provision of layer 60. As discussed below with reference to FIGS. 4 and 5, pad area 65 forms an anode contact 67 for electrical connection to the anode of the finally formed battery.

Figure 3D:
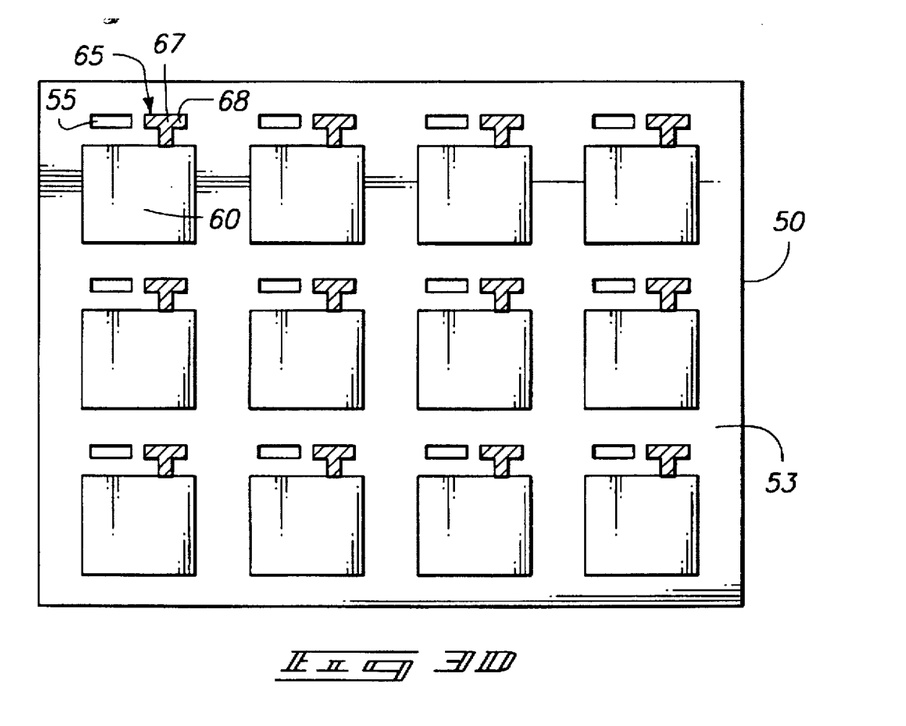

Referring to FIG. 3(D), second conductive pad 65 may be covered by a capped tip 68. Tip 68 is preferably formed by printing a carbon based polymer thick film ink directly onto a portion of second conductive pad 65 and curing the combination using the techniques described above regarding the curing of layer 20. Capped tip 68 increases the wear resistance and durability of anode contact 67.

Figure 3E:
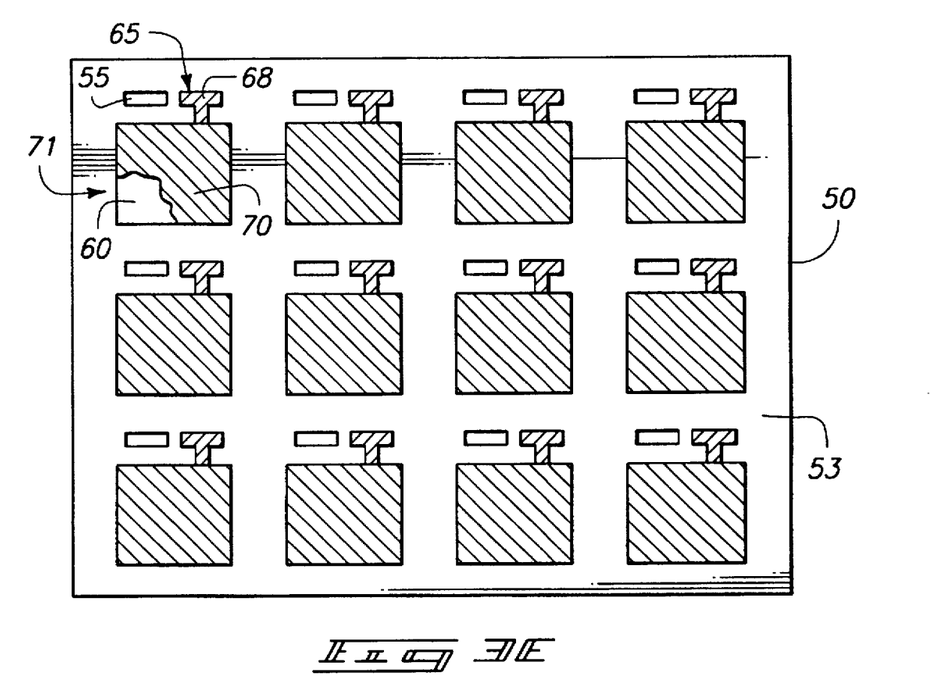

Referring to FIG. 3(E), an anode layer 70 is provided superjacent second conductive layer 60. Anode layer 70 comprises an alkali metal, preferably lithium. Anode layer 70 is preferably provided over conductive layer 60 by a wave-soldering-like method in which the base 50 and conductive layer 60 is inverted over a molten "wave" of the alkali metal. The alkali metal then contacts conductive layer 60 and fuses to the conductive layer. The molten "wave" of alkali metal may also contact portions of the upper surface 53 which are not covered by conductive layer 60, and which are therefore exposed. However, as the alkali metal cannot fuse to such exposed portions of upper surface 53, the alkali metal simply falls off the upper surface 53 to once again expose the upper surface 53.

If the conductive layer 60 is formed from a conductive ink, the layer 60 will comprise an exposed surface having metal flecks dispersed throughout a polymeric material. Since the alkali metal generally fuses to the metallic flecks and not to the polymeric material, the alkali metal may be non-homogeneously distributed superjacent the surface of layer 60 when the alkali metal is fused to layer 60. This effect is mitigated somewhat by heating the conductive layer 60 during the fusing step. The heating softens the polymeric material of layer 60, enabling the alkali metal to penetrate the polymeric material and to thereby fuse with metal flecks that were originally below the exposed surface of layer 60. The effect can be mitigated further by plating the conductive layer 60, such as with the process described previously, so that the exposed surface of 60 comprises a uniform metal plate layer. Such a uniform metal plate layer provides an excellent surface for the alkali metal to fuse with.

Generally, if the conductive pad 65 is provided prior to the provision of anode layer 70, the conductive pad 65 will be covered with a masking layer (not shown) during the provision of anode layer 70. This prevents the alkali metal of anode layer 70 from fusing to either the material of conductive pad 65 or the material of tip 68 (if tip 68 is present). Preferred masking materials are polyimide or polyester materials, cut to a size which covers pad 65 and leaves layer 60 exposed, and preferably comprising an adhesive backing to simplify the application of the masking layer over pad 65. An example polyimide material which has been found to be particularly satisfactory is a tape sold under the trademark KAPTON by Dupont.

The provision of anode layer 70 over conductive layer 60 completes the formation of an anode base 71. The individual anode bases 71 can next be cut-away and separated from one another. In a less preferred embodiment of the invention, which has not been shown, only one individual anode base 71 is patterned onto the insulative base 50. In such a less preferred embodiment there is no need to cut and separate individual anode bases.

It is noted that the method of formation of anode base 71 of the present invention has many steps in common with the above-discussed method of formation of cathode base 31 of the present invention. Accordingly, several of the steps of fabrication of anode base 71 may be done simultaneously with the steps of fabrication of cathode base 31. Also, as indicated above, the electrolyte film 40 may be provided superjacent the anode base 71 instead of, or in addition to, the electrolyte film being provided superjacent cathode base 31.

The alignment and coupling of an anode base 71 and a cathode base 31 to form a battery is next described with reference to FIGS. 4 and 5. It should be noted that if a masking layer was provided over conductive pad 65, this masking layer will generally be removed prior to the alignment and coupling of FIGS. 4 and 5 so as to expose the conductive pad 65 and tip 68 (if present).

Figure 4:
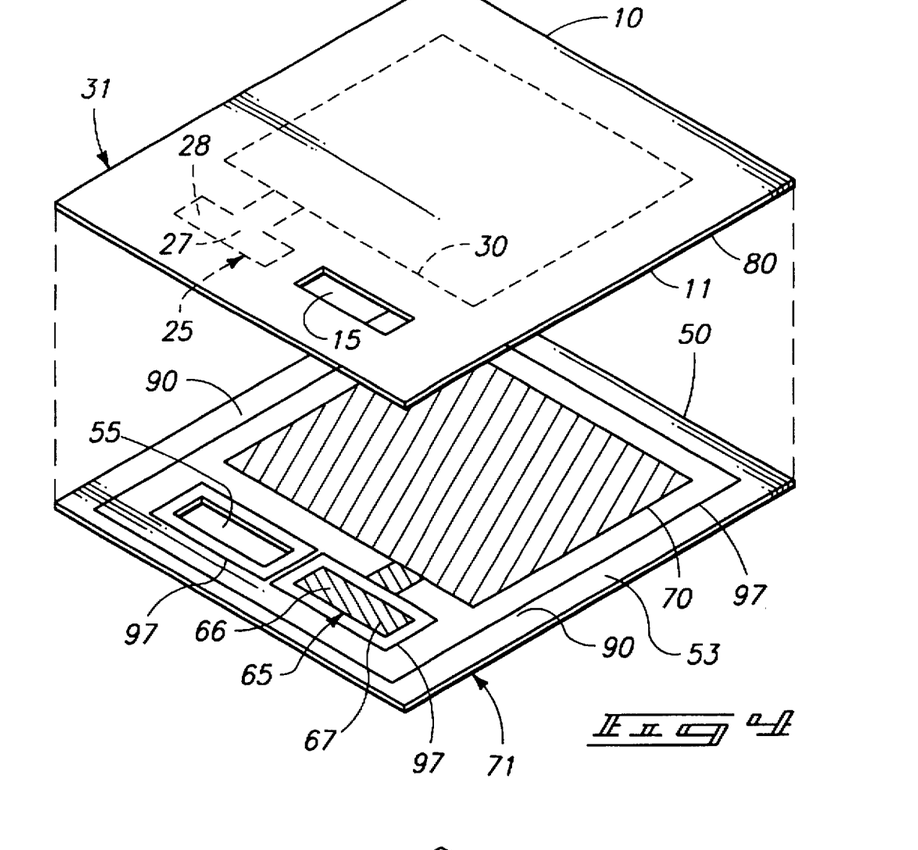
FIG. 4 is a three dimensional cut-away view of both the first and second bases prior to assembly of a battery cell.

Referring to FIG. 4, cathode base 31 and anode base 71 are shown after alignment of anode base 71 with cathode base 31. Note that a slot 15 is aligned with anode contact 67, and that a slot 55 is aligned with cathode contact 27.

The exposed portion of upper surface 11 of cathode base 31 defines an outer area 80 which surrounds the cathode layer 30 and conductive pad 25. Also, the exposed portion of upper surface 53 of anode base 71 defines an outer area 90 which surrounds the anode layer 70 and the second conductive pad 65. Preferably, adhesive is applied over a substantial portion of one or both of outer areas 80 and 90 prior to the coupling of bases 31 and 71. The adhesive fastens bases 31 and 71 together and also seals the finally formed battery construction. In a less preferable embodiment, adhesive is only applied over the peripheral areas 97 of either or both of bases 31 and 71. (Although the peripheral area is only shown in relation to base 71, it is to be understood that a similar peripheral area exists in relation to base 31.) The adhesive may be applied as a precut film or tape, may be applied before the individual anode bases 71 are cut-away and separated from one another, and may be cured by heat-sealing.

Figure 5:
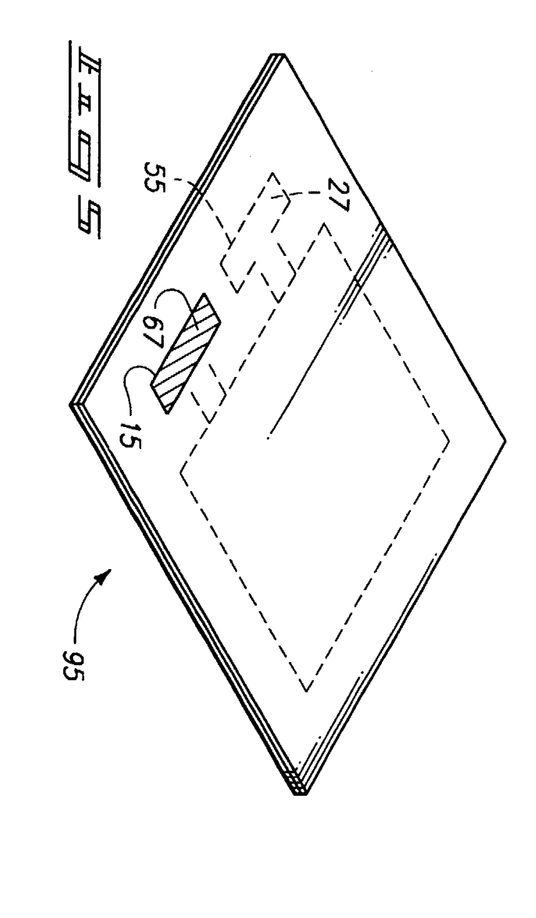
FIG. 5 is a three dimensional view of a battery cell produced by a method of the present invention.

Referring to FIG. 5, a battery 95 is shown after coupling of bases 31 and 71. In the battery construction of FIG. 5, slot 15 allows directs electrical contact to be made with anode 70 through anode contact 67. Also, slot 55 allows directs electrical contact to be made with cathode 30 through cathode contact 27. Thus, slots 15 and 55 function as access ports in a battery 95 formed by the method of the present invention.

Another way to look at the battery 95 is that it has a first conducting area, comprising cathode layer 30 and first conductive layer 20 (shown in FIG. 2F), and a second conducting area, comprising anode layer 70 and second conductive layer 60 (shown in FIG. 3E), which are sandwiched between nonconductive sheets 10 and 50. Slots 15 and 55 constitute orifices in the nonconductive sheets to provide electrical access to the anode terminal 67 and the cathode terminal 27, respectively.

All of the U.S. patents cited herein are hereby incorporated by reference as if set forth in their entirety.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A battery comprising:

a first nonconductive layer;

a first conductive layer against the first nonconductive layer;

a cathode against the first conductive layer;

a second nonconductive layer;

a second conductive layer against the second nonconductive layer, the second conductive layer comprising a cured conductive ink; and an alkali metal attached to the second conductive layer.

2. The battery of claim 1 wherein the alkali metal is lithium.

3. The battery of claim 1 wherein the first conductive layer comprises a cured conductive ink.

4. The battery of claim 1 wherein the first nonconductive layer comprises an anode access slot to provide electrical access to the alkali metal.

5. The battery of claim 1 wherein the second nonconductive layer comprises a cathode access slot to provide electrical access to the cathode.

6. The battery of claim 1 wherein the first nonconductive layer comprises an anode access slot to provide electrical access to the alkali metal, wherein the second nonconductive layer comprises a cathode access slot to provide electrical access to the cathode, and further comprising:

an anode contact adjacent the second nonconductive layer; and a cathode contact adjacent the first nonconductive layer.

7. The battery of claim 6 wherein the anode contact comprises a cured conductive ink, and wherein the cathode contact comprises a cured conductive ink.

8. The battery of claim 6 wherein the anode contact comprises a cured conductive ink and a tip comprising a cured carbon based polymer thick film ink, and wherein the cathode contact comprises a cured conductive ink and a tip comprising a cured carbon based polymer thick film ink.

9. A battery comprising:

a nonconductive layer;

a conductive layer against the nonconductive layer, the conductive layer comprising a cured conductive ink; and an alkali metal fused to the conductive layer.

10. The battery of claim 9 wherein the alkali metal is lithium.

11. The battery of claim 9 wherein the conductive layer further comprises a metal layer plated to the cured conductive ink.

12. The battery of claim 9 wherein the conductive layer further comprises a metal layer plated to the cured conductive ink and wherein the alkali metal is fused to the metal layer.

\* \* \* \* \*

UNITED STATES PATENT AND TRADEMARK OFFICE
CERTIFICATE OF CORRECTION

PATENT NO. : 5,747,190
DATED : May 5, 1998
INVENTOR(S) : Rickie C. Lake

It is certified that error appears in the above-identified patent and that said Letters Patent is hereby corrected as shown below:

Col. 5, line 28
 replace "stencil s"
 with --stencil--.

Signed and Sealed this

First Day of September, 1998

Attest:

BRUCE LEHMAN

*Attesting Officer*     *Commissioner of Patents and Trademarks*